UNITED STATES PATENT OFFICE.

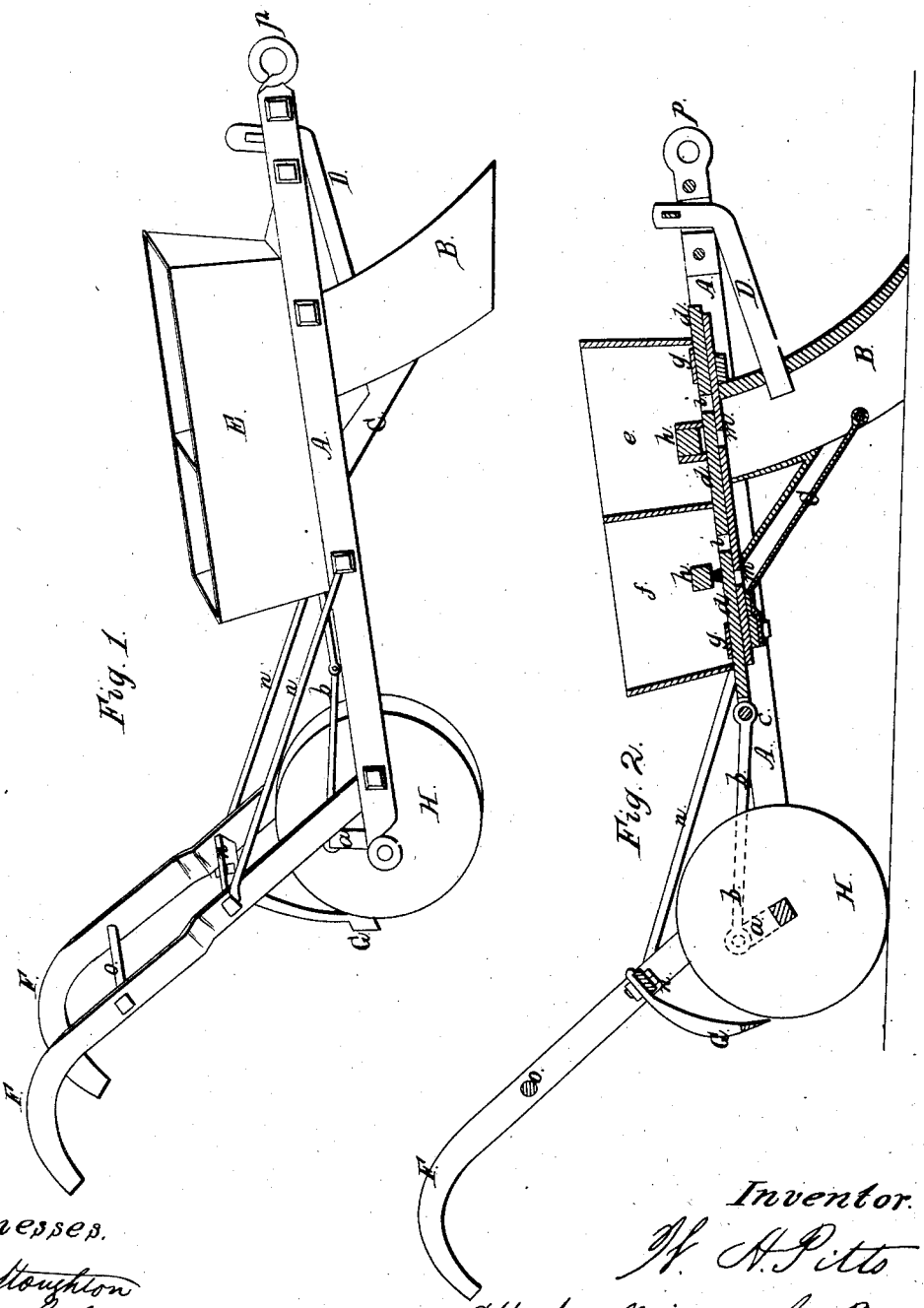

W. C. PITTS, OF AUSTIN, TEXAS.

IMPROVEMENT IN SEED-PLANTERS.

Specification forming part of Letters Patent No. 28,301, dated May 15, 1860.

*To all whom it may concern:*

Be it known that I, WILLIAM C. PITTS, of the city of Austin, in the county of Travis, in the State of Texas, have invented a new and useful Improvement on Machines for Planting Corn, Cotton, and other Seeds; and I do declare that the following is a full and exact description of the construction of the same, reference being had to the annexed drawings, making a part of this specification, in which—

Figure 1 is a perspective view, and Fig. 2 is a delineation of a section, consisting of the beam-plate resting upon the same, the slide and bars across the same, pitman-crank, and roller or driving-wheel.

The following is a description of the construction and operation of the machine.

A, Fig. 1, is a double beam, consisting of two iron bars bolted together in front with two bolts, leaving a space for the rod to come through diverging and widening to the back, the ends of crank or axle of the roller or driving-wheel working in the eye or holes in the ends of the same.

B, Fig. 1, is a steel plow, made of share-steel, five inches wide and one-fourth inch thick, welded in front from bottom to top, leaving a space for the rod to pass through, opening behind three inches at the top and two inches at the bottom, each share turning out at the bottom, so as to give it shape, leaving the plow in such shape at the bottom as to cut the furrow without throwing out the dirt, letting the same fall back into the furrow, thus covering the seeds without any dry dirt falling upon or in contact with them, and covering the seeds without the aid of harrow-teeth or small plows attached behind the main plow to throw the dirt back into the furrow, thus doing away with the harrow-teeth or small plows to cover the seeds, which are very much in the way by clogging with weeds, wet dirt, and otherwise, requiring constant stoppage to clear them off. At top of the plow are two ears, turning off square or horizontally, with a hole in each, through which a bolt or screw passes to confine the plow to the plate resting on the beam. The back of the hollow of the plow is shut or closed up by a plate of sheet-iron, fastened at the top by the bolts or screws holding the plow to the plate, the lower end confined to the plow by a brace or rod. In or near the lower end of the plate is a hole, receiving a tube coming out of the hindmost or the second division of the seed-box, by which seeds from that box are dropped into the hollow of the plow, and dropped at the same time with guano or different seeds from the front seed-box directly through the hollow of the plow. This tube, letter C, Fig. 1, is confined at the upper end to the plate resting upon the cross-bars, attached to the beam by a plate of iron screwed or bolted to the back cross-bar.

D, Fig. 1, is an iron rod coming out of the plow, held by a head on the rod inside of the hollow of the plow, front end turning up and passing through the space between the two bars at the front end of the beam, and confined by an iron key through a hole in the rod, thus bracing and confining the plow firmly.

E, Fig. 1, is a double seed-box of sheet-iron, eighteen inches long and six and a half inches wide at the bottom, twenty inches long and ten inches wide at the top, divided by a partition crosswise through the middle. The bottom is covered with the exception of a space for the slide to work in, which is an inch and a half wide, the length of the box, and in the middle of the bottom of the box. The box is confined to the plate on the beam by four bolts passing through guides of the slide, the plate, and the cross-bars of the beam. One of the guides is inside and across the bottom of the fore part of the first division of the seed-box, and the other is across the bottom of back part of the second division. From the front division of the box guano may be distributed and seed planted from the back or rear division, or different kinds of seeds may be planted very regularly together from the two divisions of the box.

F F, Fig. 1, are the handles, which are attached to either bar of the beam, a little in front of the crank, by bolts or screws. The handles are confined together by cross-bars, one four inches above the roller and the other at any convenient distance above.

G, Fig. 1, is a scraper, attached by a bolt to lower cross-bar of the handles, running down nearly to the center of the driving-wheel or roller H, with a steel blade the width of the roller, confined near the roller, scraping the dirt from the roller, and prevents its accumulation and clogging. On the axle of the wheel or roller H there is a crank, *a*, to which one end of a pitman, $b$, is fastened, the other end of said pitman being pivoted at $c$ to the seed-slide $d$, that passes longitudinally through the front and rear hoppers, $ef$, being guided in its movements by pieces $gg$, under which it moves. About midway of each of these hoppers there is a brush or elastic scraper, $h$, for brushing back the excess of seed or guano over and above that which is to be carried from their respective hoppers by the cells $i$ in the slide $d$. The cells $i$, which are simply holes through the slide, move forward and back of the brushes $h$, receiving a charge at both ends of its hopper and carrying them to the exits $m$, which are immediately under the brushes. From these exits the seed and guano, or whatever other article is sown with the seed—as lime, ashes, &c.—run down their respective tubes C B to a common delivery point, whence they drop into the furrow previously prepared by the plow B, which also constitutes a tube or seed-duct, it being hollow for that purpose. The guano or other fertilizer sown with the seed is placed in the front hopper, $e$, and, as the distance is less from this hopper to the planting-point and more direct than that from other or seed-hopper $f$, the fertilizer reaches the furrow first, and hence the seed is dropped on top of the fertilizer, which I find advantageous.

$n$ are brace-rods; $o$, a rung for the handles; $p$, the clevis to which the beam is hitched.

It is unnecessary to particularly describe the details of this machine, as they will be readily understood from the drawings and above description.

Having thus fully described the nature and object of my invention, what I claim therein as new, and desire to secure by Letters Patent, is—

The arrangement of the double hoppers $ef$, double tubes or ducts B C, and single seed-slide $d$, operating together in the manner and for the purpose herein set forth and described.

W. C. PITTS.

Attest:
R. W. RYLANDER,
CHAS. CONEY.